United States Patent
Ye et al.

(10) Patent No.: US 9,042,122 B2
(45) Date of Patent: May 26, 2015

(54) POWER CONVERTER AND METHOD FOR BALANCING VOLTAGES ACROSS INPUT CAPACITORS

(71) Applicant: DELTA ELECTRONICS, INC., Taoyuan Hsien (TW)

(72) Inventors: Yiqing Ye, Taoyuan Hsien (TW); Chao Yan, Taoyuan Hsien (TW); Zhimin Suo, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 131 days.

(21) Appl. No.: 13/845,705

(22) Filed: Mar. 18, 2013

(65) Prior Publication Data

US 2014/0146572 A1    May 29, 2014

(30) Foreign Application Priority Data

Nov. 23, 2012    (CN) .......................... 2012 1 0485698

(51) Int. Cl.
*H02M 3/28*    (2006.01)
*H02M 3/337*    (2006.01)
*H02M 7/487*    (2007.01)
*H02M 1/00*    (2006.01)

(52) U.S. Cl.
CPC ................ *H02M 3/28* (2013.01); *H02M 3/337* (2013.01); *H02M 7/487* (2013.01); *H02M 2001/0074* (2013.01)

(58) Field of Classification Search
CPC ............................... H02M 3/28; H02M 3/337
USPC .............................................. 363/17, 37, 47
See application file for complete search history.

(56) References Cited

U.S. PATENT DOCUMENTS

| 5,808,879 | A * | 9/1998 | Liu et al. ......................... 363/17 |
| 8,411,473 | B2 * | 4/2013 | Cheng et al. .................... 363/37 |
| 2009/0213622 | A1 * | 8/2009 | Cesnak et al. .................. 363/17 |
| 2012/0262955 | A1 | 10/2012 | Yan et al. |

FOREIGN PATENT DOCUMENTS

| CN | 101373933 | 2/2009 |
| CN | 1523746 | 4/2010 |

(Continued)

OTHER PUBLICATIONS

Office Action dated Jul. 8, 2014 from corresponding No. TW 102100805.

*Primary Examiner* — Adolf Berhane
*Assistant Examiner* — Yemane Mehari
(74) *Attorney, Agent, or Firm* — Lowe Hauptman & Ham, LLP

(57) ABSTRACT

A power converter and a method for balancing voltages across input capacitors are disclosed in the present application. The power converter includes: two DC input terminals; a first input capacitor and a second input capacitor; a first bridge arm and a second bridge arm connected in series with one another; and an output circuit configured to generate a signal required by the power converter based on the signals at a midpoint of the first bridge arm and a midpoint of the second bridge arm. The power converter further includes: a first voltage balancing unit and a second balancing unit configured to reduce a voltage difference between the first input capacitor and the second input capacitor. The power converter provided by the present application solves the problem of imbalance in the voltages across the first input voltage and the second input voltage.

26 Claims, 15 Drawing Sheets

(56) References Cited

FOREIGN PATENT DOCUMENTS

| CN | 102332818 | 1/2012 |
| CN | 102594152 | 7/2012 |
| TW | I367623 | 7/2012 |

* cited by examiner

US 9,042,122 B2

POWER CONVERTER AND METHOD FOR BALANCING VOLTAGES ACROSS INPUT CAPACITORS

CROSS REFERENCE TO RELATED APPLICATIONS

The present application claims priority under 35 U.S.C. §119 to Chinese Patent Application No. 201210485698.1, filed on Nov. 23, 2012, the entire content of which is incorporated herein by reference.

TECHNICAL FIELD

The present application relates to power supply technologies, especially to a power converter and a method for balancing voltages across input capacitors.

BACKGROUND

Currently, various power converters are developed toward directions of high efficiency, high power density, high reliability and low cost. Among many power converters, LLC series resonant converters have main switches operating under a Zero-Voltage Switching (ZVS) condition and rectifiers operating under a Zero-Current Switching (ZCS) condition, and can optimize conversion efficiency of high voltage section for an input voltage with a wide range, so they are widely used in high efficiency Direct Current to Direct Current (DC/DC) converters or Direct Current to Alternating Current (DC/AC) converters.

In order to realize a high voltage output and meanwhile to make a bus voltage withstood by the single input capacitor or the single switching element in a LLC series resonant converter not to be over high, a plurality of input capacitors may be connected in series between buses at an input side of the LLC series resonant converter.

FIG. 15 illustratively shows a schematic structure diagram of a LLC series resonant converter in conventional technologies. In the LLC series resonant converter, a first input terminal Vbus1 and a second input terminal Vbus2 are configured to input a DC bus voltage. Two input capacitors C11 and C12 are connected in series between the first input terminal Vbus1 and the second input terminal Vbus2. The input capacitor C11 is connected in parallel with a first bridge arm B11, and the input capacitor C12 is connected in parallel with a second bridge arm B12. The first bridge arm B11 includes switching elements Q11 and Q12 connected in series, and the second bridge arm B12 includes switching elements Q13 and Q14 connected in series. The first bridge arm B11 and the second bridge arm B12 are electrically coupled to output circuits O11 and O12, respectively. The output circuits O11 and O12 have the same structures and both employ a LLC series resonant circuit.

In the circuit shown in FIG. 15, each switching element in the single bridge arm only needs to withstand ½ bus voltage, and then a high voltage output can be realized. Thus, relatively cheap switching elements with low withstanding voltages, for example, 600V Metal Oxide Semiconductor Field effect Transistors (MOSFETs), may be chosen for realizing a high voltage output.

However, the structure shown in FIG. 15 has the following problems. In an ideal operating condition, the voltages across the two input capacitors C11 and C12 should be equal. However, because of limitations in the manufacturing process or other factors of practical switching elements, it is usually hard for the device parameters of switching elements to be completely consistent and they have more or less variations. Thus, turn-on time and turn-off time of different switching elements may vary, resulting in the difference of discharging time between the two input capacitors C11 and C12 and thereby causing the voltages across the input capacitors C11 and C12 to be unbalanced. The voltage imbalance will result in voltage difference between the switching elements, causing the switching elements to be damaged or even causing abnormal operation of the power converter.

In order to overcome the above problems, one of the methods is to employ hardware. For example, additional power converters may be employed to inject current into corresponding input capacitors or to draw current from corresponding capacitors so as to compensate the voltage imbalance. However, these methods will make the cost of the system remarkably increase.

SUMMARY OF THE INVENTION

The present application provides a power converter to overcome the problem that switching elements are damaged because of imbalance between voltages across input capacitors in the power converter.

The present application provides a power converter including:
two Direct Current (DC) input terminals;
a first input capacitor and a second input capacitor connected in series between the two DC input terminals;
a first bridge arm and a second bridge arm connected in series between the two DC input terminals, the first bridge arm being connected in parallel with the first input capacitor and having a first bridge arm midpoint, the second bridge arm being connected in parallel with the second input capacitor and having a second bridge arm midpoint;
a first voltage balancing unit and a second voltage balancing unit, each of which has three terminals; two terminals of the first voltage balancing unit being connected in parallel with the first input capacitor and a remaining terminal being connected with the second bridge arm midpoint, two terminals of the second voltage balancing unit being connected in parallel with the second input capacitor and a remaining terminal being connected with the first bridge arm midpoint, and the first voltage balancing unit and the second voltage balancing unit being configured to reduce a voltage difference between the first input capacitor and the second input capacitor; and
an output circuit electrically coupled with the first bridge arm midpoint and the second bridge arm midpoint.

The present application further provides a power converter including:
two Direct Current (DC) input terminals;
N input capacitors connected in series between the two DC input terminals; and
N power modules;
wherein each of the N power modules comprises:
  a bridge arm being connected in parallel with a corresponding input capacitor, having a bridge arm midpoint, and being connected in series with a bridge arm in an adjacent power module;
  a voltage balancing unit comprising an unidirectional bridge arm which has a unidirectional bridge arm midpoint, being connected in parallel with the corresponding input capacitor and being connected in series with an unidirectional bridge arm in the adjacent power module;
  for a first power module in which a voltage balancing unit resides having only one adjacent power module, the voltage balancing unit in the first power module further comprises a capacitive branch having a terminal connected with the unidirectional bridge arm midpoint and the other terminal connected with a bridge arm midpoint in the adjacent power module;

for a second power module in which a voltage balancing unit resides having two adjacent power modules, the voltage balancing unit in the second power module further comprises two capacitive branches each of which has a terminal connected with the unidirectional bridge arm midpoint and the other terminal connected with a bridge arm midpoint in corresponding one of the two adjacent power modules; and an output circuit having a terminal connected with the bridge arm midpoint and the other terminal connected with a terminal of the input capacitor connected in parallel with the bridge arm;

wherein N is a natural number being equal to or greater than 3.

The present application further provides a method for balancing voltages across input capacitors in the above-mentioned power converter, including:

providing a power converter which comprises: two Direct Current (DC) input terminals; a first input capacitor and a second input capacitor connected in series between the two DC input terminals; a first bridge arm and a second bridge arm connected in series between the two DC input terminals, the first bridge arm being connected in parallel with the first input capacitor and having a first bridge arm midpoint, the second bridge arm being connected in parallel with the second input capacitor and having a second bridge arm midpoint; and an output circuit electrically coupled with the first bridge arm midpoint and the second bridge arm midpoint;

when voltages across the first input capacitor and the second input capacitor differ from one another, adding voltage balancing units the number of which is equal to the number of the input capacitors, comprising: a first voltage balancing unit and a second voltage balancing unit;

during a half operating cycle of the power converter, controlling the first input capacitor to charge the second voltage balancing unit, and controlling the second input capacitor to charge the first voltage balancing unit;

during the other half operating cycle of the power converter, controlling the first voltage balancing unit to charge the first input capacitor or controlling the second voltage balancing unit to charge the second input capacitor; and after several operating cycles of the power converter, a voltage difference between the first input capacitor and the second input capacitor being reduced.

The present application further provides a method for balancing voltages across input capacitors in a power converter including:

providing a power converter which comprises:

two Direct Current (DC) input terminals;

N input capacitors connected in series between the two DC input terminals; and

N power modules connected in parallel with the N input capacitors respectively;

wherein each of the N power modules comprises: a bridge arm being connected in parallel with corresponding one of the N input capacitors, having a bridge arm midpoint and being connected in series with a bridge arm in an adjacent power module; and an output circuit having a terminal connected with the bridge arm midpoint and the other terminal connected with a terminal of the input capacitor which is in parallel with the bridge arm; and wherein N is a natural number being equal to or greater than 3;

when voltages across the N input capacitors differ from one another, adding into each power module a voltage balancing unit comprising an unidirectional bridge arm which has a unidirectional bridge arm midpoint, is connected in parallel with the corresponding one of the N input capacitors and is connected in series with an unidirectional bridge arm in the adjacent power module;

for a first power module in which a voltage balancing unit resides having only one adjacent power module, the voltage balancing unit in the first power module further comprises a capacitive branch having a terminal connected with the unidirectional bridge arm midpoint and the other terminal connected with a bridge arm midpoint in the adjacent power module;

for a second power module in which a voltage balancing unit resides having two adjacent power modules, the voltage balancing unit in the second power module further comprises two capacitive branches each of which has a terminal connected with the unidirectional bridge arm midpoint and the other terminal connected with a bridge arm midpoint in corresponding one of the two adjacent power modules;

wherein the method further comprises:

controlling input capacitors having relatively higher voltages than adjacent input capacitors to charge voltage balancing units in power modules corresponding to the adjacent input capacitors having relatively lower voltages; and controlling the voltage balancing units in the power modules corresponding to the adjacent input capacitors having relatively lower voltages to charge the adjacent input capacitors having relatively lower voltages.

In the power converter and the voltage balancing method provided by the present application, by adding voltage balancing units, the problem of imbalance in voltages across a plurality of input capacitors is solved. From another viewpoint, the added voltage balancing units have elements included therein with relatively small size, do not need controllers and thus have good reliability or low losses.

Embodiments of the present application will be described below with reference to the accompanying drawings so as to further facilitate understanding the disclosure of the present application and the scope protected by the claims.

DESCRIPTION OF THE EMBODIMENTS

Embodiments of the present application will be described below in detail. It should be noted that the embodiments described herein are for illustration purposes only but not to limit the present application.

Figure 1:
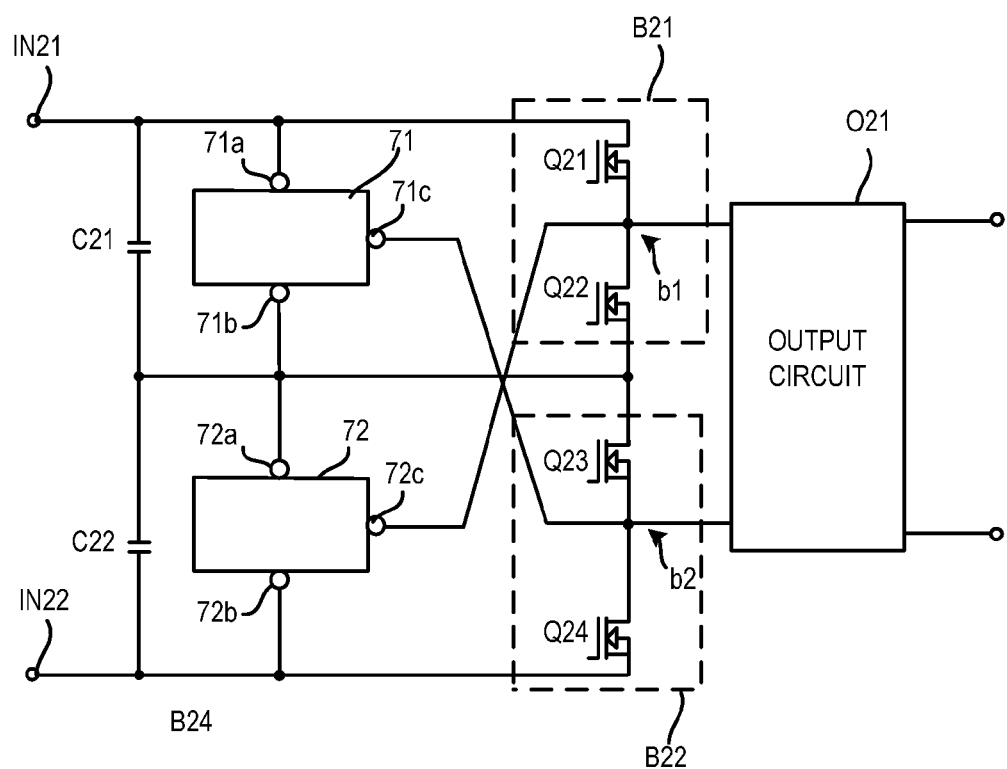
FIG. 1 illustratively shows a schematic structure diagram of a power converter according to an embodiment of the present application.

FIG. 1 illustratively shows a schematic structure diagram of a power converter according to an embodiment of the present application. The power converter includes a first DC input terminal IN21, a second DC input terminal IN22, a first input capacitor C21, a second input capacitor C22, a first bridge arm B21, a second bridge arm B22 and an output circuit O21. The power converter further includes a first voltage balancing unit 71 and a second voltage balancing unit 72 which are configured to reduce a voltage difference between the first input capacitor C21 and the second input capacitor C22.

A DC bus voltage can be input to the first DC input terminal IN21 and the second DC input terminal IN22. The first DC input terminal IN21 may serve as a positive input terminal and the second DC input terminal IN22 may serve as a negative input terminal.

The first input capacitor C21 and the second input capacitor C22 are connected in series between the first DC input terminal IN21 and the second DC input terminal IN22.

The first bridge arm B21 and the second bridge arm B22 are connected in series between the two DC input terminals IN21 and IN22. The first bridge arm B21 is connected in parallel with the first input capacitor C21, and the second bridge arm B22 is connected in parallel with the second input capacitor C22. The first bridge arm B21 or the second bridge arm B22 may include a plurality of switching elements connected in series. For example, the first bridge arm B21 may include a first switching element Q21 and a second switching element Q22 connected in series, and the two switching elements Q21 and Q22 have complementary on and off. A junction of the first switching element Q21 and the second switching element Q22 serves as a bridge arm midpoint b1 of the first bridge arm B21. The second bridge arm B22 may include a third switching element Q23 and a fourth switching element Q24 connected in series, and the two switching elements Q23 and Q24 have complementary on and off. A junction of the third switching element Q23 and the fourth switching element Q24 serves as a bridge arm midpoint b2 of the second bridge arm B22. With the control on the on and off of every switching element, the input DC bus voltage can be converted into an AC voltage. All switching elements Q21, Q22, Q23 and Q24 may be configured by various types of transistors, such as Junction type Field Effect Transistor (JFET) or MOSFET.

The output circuit O21 is connected between the midpoint b1 of the first bridge arm B21 and the midpoint b2 of the second bridge arm B22 and is configured to generate an output signal required by the power converter based on signals at the midpoints b1 and b2. Specifically, if the power converter is a DC/DC converter, the output circuit O21 may generate a DC voltage based on AC voltages at the midpoints b1 and b2; if the power converter is a DC/AC converter, the output circuit O21 may generate an AC voltage suitable for output based on AC voltages at the midpoints b1 and b2.

Each of the first voltage balancing unit 71 and the second voltage balancing unit 72 has three terminals. Two terminals 71a and 71b of the first voltage balancing unit 71 are connected in parallel with the first input capacitor C21, and another terminal 71c is connected with the midpoint b2 of the second bridge arm. Two terminals 72a and 72b of the second voltage balancing unit 72 are connected in parallel with the second input capacitor C22, and another terminal 72c is connected with the midpoint b1 of the first bridge arm.

In the power converter shown in FIG. 1, the first voltage balancing unit 71 and the second voltage balancing unit 72 play a role of balancing the voltage across the first input capacitor C21 and the voltage across the second input capacitor C22. Taking FIG. 1 as an example, when the switching elements Q21 and Q24 are controlled to be turned on and the switching elements Q22 and Q23 are controlled to be turned off, the first input capacitor C21 charges the second voltage balancing unit 72, and the second input capacitor C22 charges the first voltage balancing unit 71. When the switching elements Q22 and Q23 are controlled to be turned on and the switching elements Q21 and Q24 are controlled to be turned off, the first voltage balancing unit 71 charges the first input capacitor C21, or the second voltage balancing unit 72 charges the second input capacitor C22. By several times of such charging and discharging process, the first voltage balancing unit 71 and the second voltage balancing unit 72 can transfer charges between the first input capacitor C21 and the second input capacitor C22 to make the voltages across the two input capacitors tend to be equal.

In the structure shown in FIG. 1, by adding two voltage balancing units, the problem of imbalance in the voltages across a plurality of input capacitors is solved.

Figure 2:
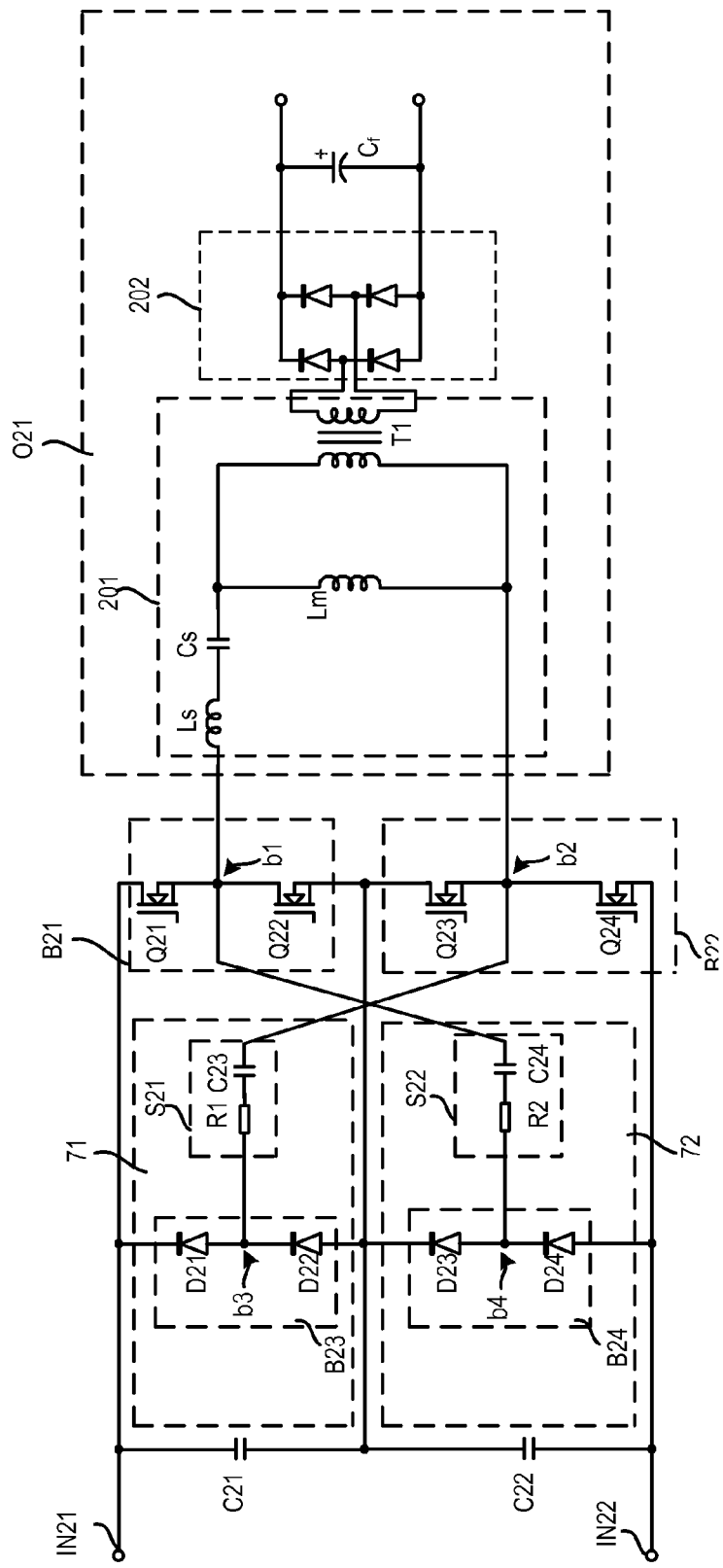
FIG. 2 illustratively shows a schematic structure diagram of a power converter according to another embodiment of the present application.

FIG. 2 illustratively shows a schematic structure diagram of voltage balancing units in a power converter according to an embodiment of the present application.

In the embodiment of voltage balancing units, the first voltage balancing unit 71 includes a first unidirectional bridge arm B23 and a first capacitive branch S21. The first unidirectional bridge arm B23 has two terminals connected in parallel with the first input capacitor C21 and is provided with a unidirectional bridge arm midpoint b3. The two terminals of the first unidirectional bridge arm B23 may be considered as the two terminals 71a and 71b of the first voltage balancing unit 71 in FIG. 1. One terminal of the first capacitive branch S21 is connected with the midpoint b3 of the first unidirectional bridge arm B23, and the other terminal is connected with the midpoint b2 of the second bridge arm B22. The terminal, which is connected with the midpoint b2 of the second bridge arm B22, of the first capacitive branch S21 may be considered as the terminal 71c of the first voltage balancing unit 71 in FIG. 1.

The first unidirectional bridge arm B23 may include two diodes D21 and D22. An anode of the diode D21 is connected with a cathode of the diode D22 to form the midpoint b3 of the unidirectional bridge arm B23. A cathode of the diode D21 and an anode of the diode D22 are connected with two terminals of the first input capacitor C21, respectively.

The first capacitive branch S21 includes a first auxiliary capacitor C23 and a first auxiliary resistor R1 which are connected in series with one another.

The second voltage balancing unit 72 includes a second unidirectional bridge arm B24 and a second capacitive branch S22. The second unidirectional bridge arm B24 has two terminals connected in parallel with the second input capacitor C22 and is provided with a unidirectional bridge arm midpoint b4. The two terminals of the second unidirectional bridge arm B24 may be considered as the two terminals 72a and 72b of the second voltage balancing unit 72 in FIG. 1. One terminal of the second capacitive branch S22 is connected with the midpoint b3 of the second unidirectional bridge arm B24, and the other terminal is connected with the midpoint b1 of the first bridge arm B21. The terminal, which is connected with the midpoint b1 of the first bridge arm B21, of the second capacitive branch S22 may be considered as the terminal 72c of the second voltage balancing unit 72 in FIG. 1.

The second unidirectional bridge arm B24 may include two diodes D23 and D24. An anode of the diode D23 is connected with a cathode of the diode D24 to form the midpoint b4 of the unidirectional bridge arm B24. A cathode of the diode D23 and an anode of the diode D24 are connected with two terminals of the second input capacitor C22 respectively.

The second capacitive branch S22 includes a second auxiliary capacitor C24 and a second auxiliary resistor R2 which are connected in series with one another.

FIG. 2 shows a structure of a DC/DC converter. The output circuit O21 includes a resonant circuit 201, a rectifier circuit 202 and an output capacitor $C_f$.

The resonant circuit 201 is configured to be a LLC series resonant circuit, and includes a resonant inductor Ls, a resonant capacitor Cs and a transformer T1 which are connected in series between the midpoint b1 of the first bridge arm B21 and the midpoint b2 of the second bridge arm B22.

A primary side of the transformer T1 equivalently includes a magnetizing inductor Lm. Two terminals at a secondary side of the transformer T1 are electrically coupled to two input terminals of the rectifier circuit 202. The transformer T1 plays a role of transformation and isolation.

The rectifier circuit 202 converts an AC voltage at the secondary side of the transformer T1 into a DC voltage. The rectifier circuit 202 may be configured to be a full-bridge rectifier circuit as exemplified in FIG. 2, and certainly may be configured to be other forms of rectifier circuits. The output capacitor $C_f$ is bridged across the two output terminals of the rectifier circuit 202.

Figure 3:
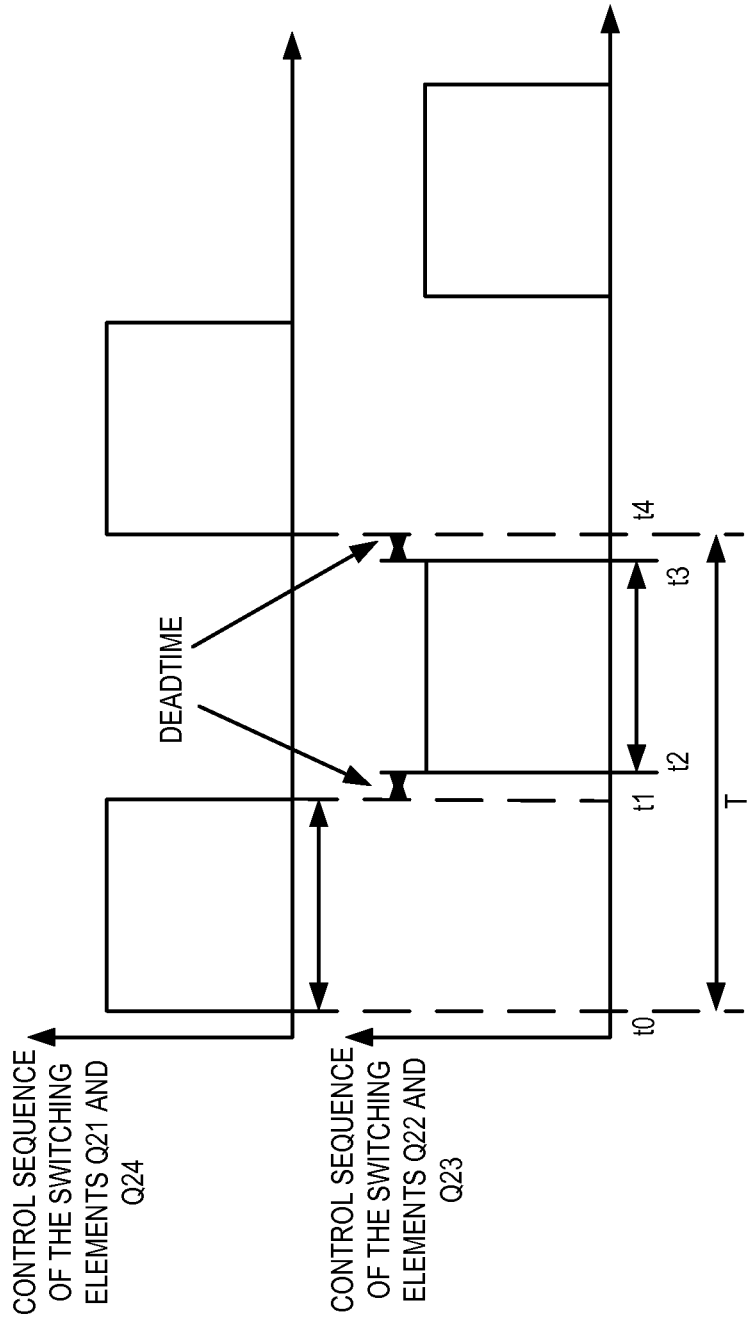
FIG. 3 illustratively shows a control sequence diagram of respective switching elements in FIG. 2.

FIG. 3 illustratively shows a control sequence diagram of all switching elements in FIG. 2. The control signal of the first switching element Q21 and the control signal of the second switching element Q22 are complementary, and the control signal of the third switching element Q23 and the control signal of the fourth switching element Q24 are complementary. The control signals of all switching elements have a duty ratio close to 50%, but are not limited to this, and other values of duty ratio may be employed on condition that the switching elements in each bridge arm have complementary on and off. In FIG. 3, T represents a switching cycle of the first bridge arm B21 and the second bridge arm B22.

The operating principles of the power converter shown in FIG. 2 will be described below in detail with reference to the sequence diagram in FIG. 3.

Time Period of (t0~t1)

The switching elements Q21 and Q24 are turned on, and the switching elements Q22 and Q23 are turned off. The bus voltage is applied on the LLC series resonant circuit through the switching elements Q21 and Q24. The operating modes of the LLC series resonant circuit during this time period is the same as that of a usual LLC series resonant circuit and detailed descriptions are omitted.

Figure 4:
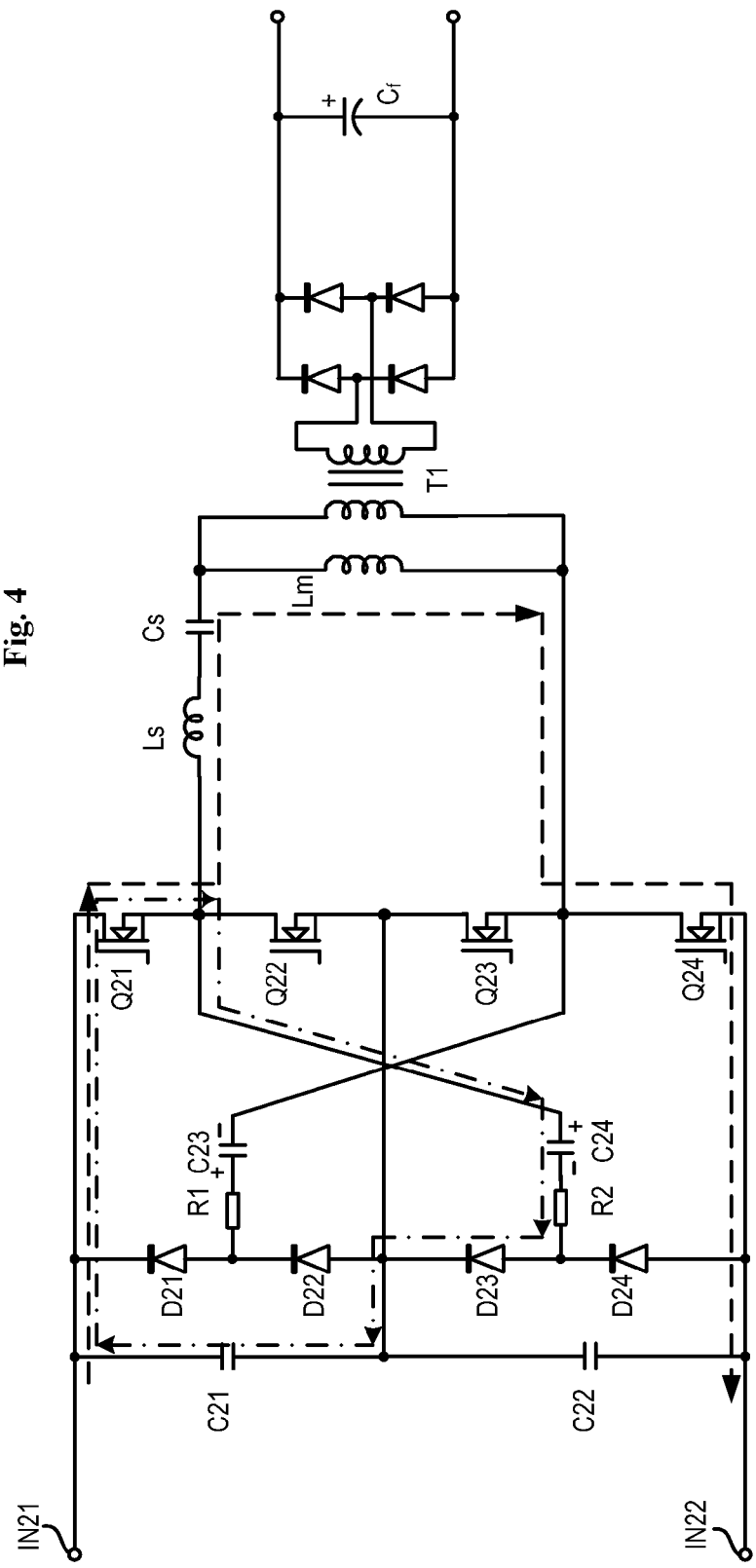
FIG. 4 illustratively shows a schematic view of the charging loop of a second auxiliary capacitor when a first switching element and a fourth switching element are turned on and a second switching element and a third switching element are turned off.

Meanwhile, the first input capacitor C21 charges the second auxiliary capacitor C24 through the first switching element Q21 and the third diode D23 with a polarity of left negative and right positive, and the voltage VC21 across the first input capacitor C21 and the voltage VC24 across the second auxiliary capacitor C24 are equal to one another, i.e., VC21=VC24. A schematic view of the charging loop of the second auxiliary capacitor C24 when the first switching element Q21 and the fourth switching element Q24 are turned on and the second switching element Q22 and the third switching element Q23 are turned off is illustratively shown as FIG. 4, in which the dot-dash line represents the charging loop and the dotted line represents the resonant loop.

Figure 5:
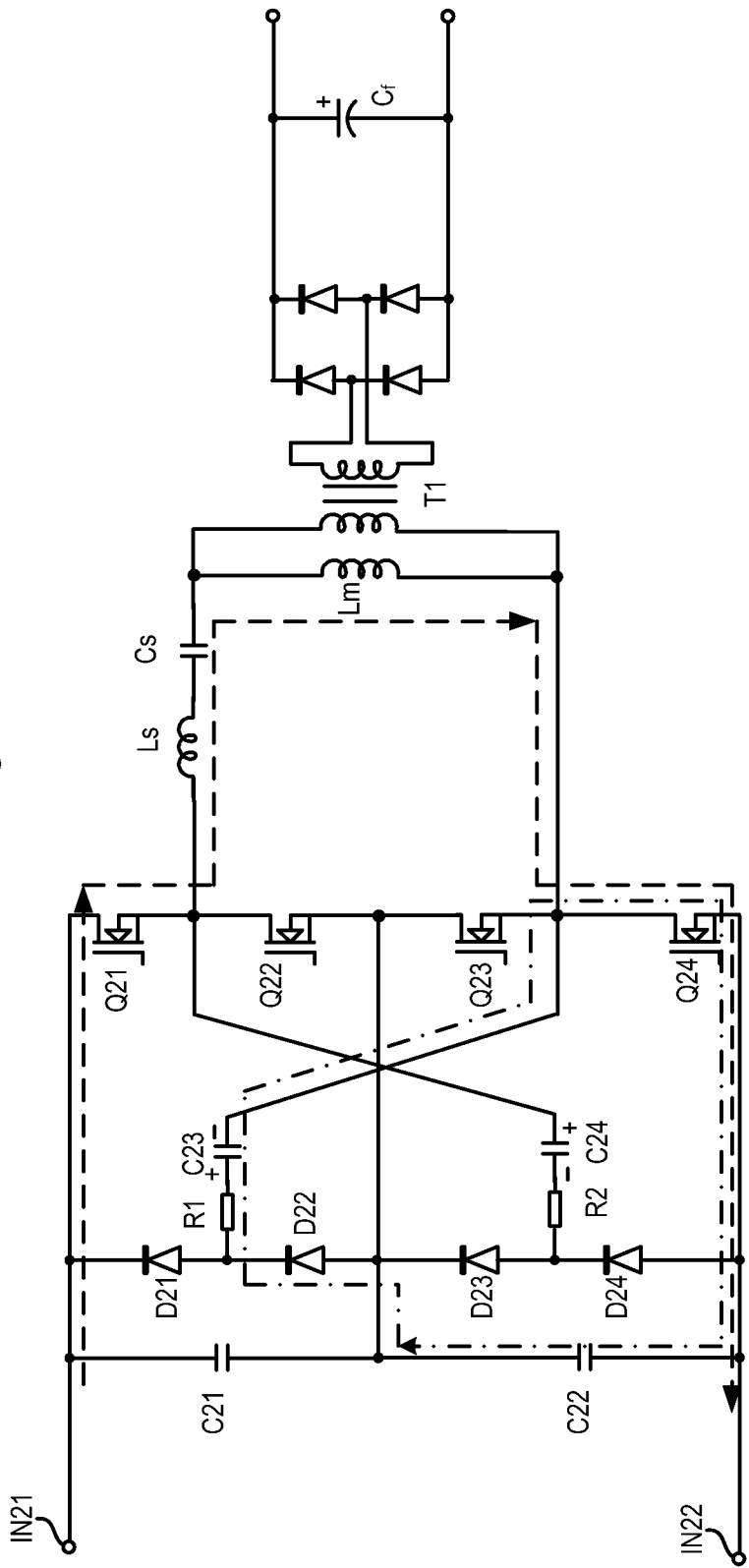
FIG. 5 illustratively shows a schematic view of the charging loop of a first auxiliary capacitor when a first switching element and a fourth switching element are turned on and a second switching element and a third switching element are turned off.

Furthermore, the second input capacitor C22 charges the first auxiliary capacitor C23 through the fourth switching element Q24 and the second diode D22 with a polarity of left positive and right negative, and the voltage VC22 across the second input capacitor C22 and the voltage VC23 across the first auxiliary capacitor C23 are equal to one another, i.e., VC22=VC23. A schematic view of the charging loop of the first auxiliary capacitor C23 when the first switching element Q21 and the fourth switching element Q24 are turned on and the second switching element Q22 and the third switching element Q23 are turned off is illustratively shown as FIG. 5, in which the dot-dash line represents the charging loop and the dotted line represents the resonant loop.

Time Period of (t2~t3)

The second switching element Q22 and the third switching element Q23 are turned on, and the first switching element Q21 and the fourth switching element Q24 are turned off. The bus voltage is applied on the LLC series resonant circuit through the second switching element Q22 and the third switching element Q23. The operating modes of the LLC series resonant circuit during this time period is the same as that of a usual LLC series resonant circuit and detailed descriptions are omitted.

Figure 6:
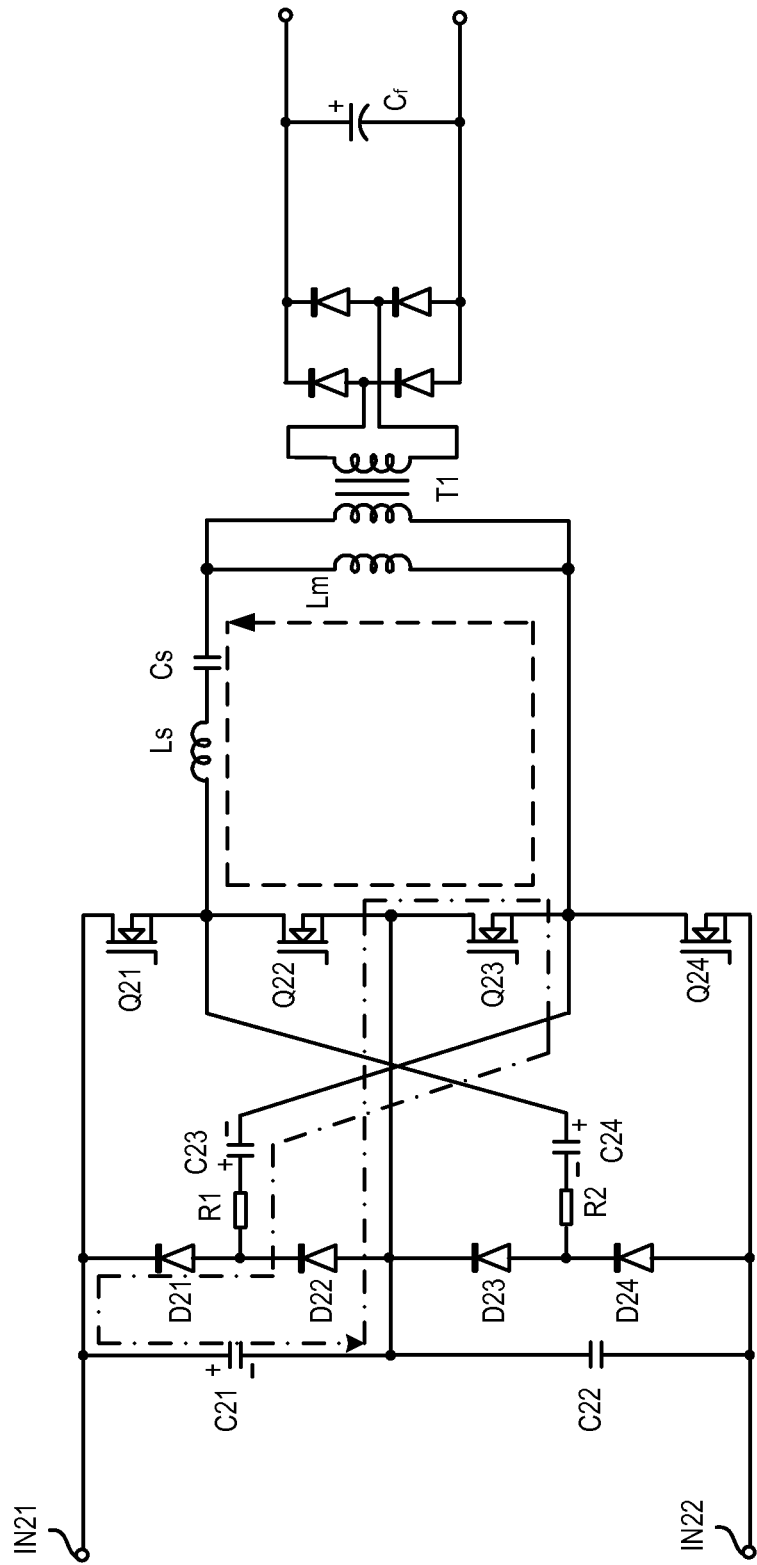
FIG. 6 illustratively shows a schematic view of the charging loop of a first auxiliary capacitor C23 charging a first input capacitor when a second switching element and a third switching element are turned on and a first switching element and a fourth switching element are turned off.
Figure 7:
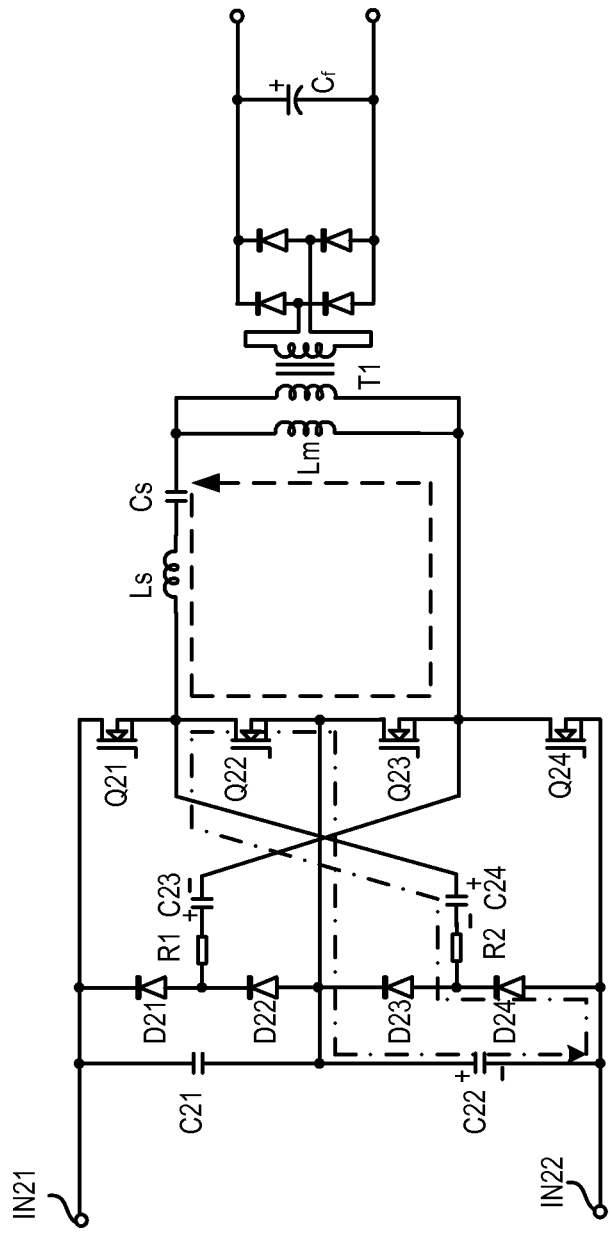
FIG. 7 illustratively shows a schematic view of the charging loop of a second auxiliary capacitor charging a second input capacitor when a second switching element and a third switching element are turned on and a first switching element and a fourth switching element are turned off.

Meanwhile, the first auxiliary capacitor C23 charges the first input capacitor C21 through the switching element Q23 and the first diode D21 with a polarity of upper positive and lower negative, and the voltage across the first auxiliary capacitor C23 and the voltage across the first input capacitor C21 are equal to one another, i.e., VC23=VC21. A schematic view of the discharging loop of the first auxiliary capacitor C23 being discharged by the first input capacitor C21 when the second switching element Q22 and the third switching element Q23 are turned on and the first switching element Q21 and the fourth switching element Q24 are turned off is illustratively shown as FIG. 6, in which the dot-dash line represents the discharging loop and the dotted line represents the resonant loop.

Otherwise, the second auxiliary capacitor C24 charges the second input capacitor C22 through the second switching element Q22 and the fourth diode D24 with a polarity of upper positive and lower negative, and the voltage across the second auxiliary capacitor C24 and the voltage across the second input capacitor C22 are equal to one another, i.e., VC24=VC22. A schematic view of the discharging loop of the second auxiliary capacitor C24 being discharged by the second input capacitor C22 when the second switching element Q22 and the third switching element Q23 are turned on and the first switching element Q21 and the fourth switching element Q24 are turned off is illustratively shown as FIG. 6, in which the dot-dash line represents the discharging loop and the dotted line represents the resonant loop.

If the voltage across the first input capacitor C21 and the voltage across the second input capacitor C22 are equal to one another, i.e., if VC21=VC22, then when the first switching element Q21 and the fourth switching element Q24 are turned on, the first input capacitor C21 charges the second auxiliary capacitor C24 and the second input capacitor C22 charges the first auxiliary capacitor C23 so that the voltages across the first auxiliary capacitor C23 and the second auxiliary capacitor C24 are equal to one another, i.e., VC23=VC24, and the charges that are respectively charged to the first auxiliary capacitor C23 and the second auxiliary capacitor C24 are equal to one another. When the second switching element Q22 and the third switching element Q23 are turned on, the first auxiliary capacitor C23 charges the first input capacitor C21 and the second auxiliary capacitor C24 charges the second input capacitor C22, the charges QC21 that are charged from the first auxiliary capacitor C23 to the first input capacitor C21 and the charges QC22 that are charged from the second auxiliary capacitor C24 to the second input capacitor C22 are equal to one another, i.e., QC21=QC22.

If the voltages across the first input capacitor C21 and the second input capacitor C22 differ from one another, for example, if VC21>VC22, then when the first switching element Q21 and the fourth switching element Q24 are turned on, the first input capacitor C21 charges the second auxiliary capacitor C24 and the second input capacitor C22 charges the first auxiliary capacitor C23, and the charges QC24 that are charged from the first input capacitor C21 to the second auxiliary capacitor C24 differ from the charges QC23 that are charged from the second input capacitor C22 to the first auxiliary input capacitor C23, i.e., QC23<QC24. When the second switching element Q22 and the third switching element Q23 are turned on, only the second auxiliary capacitor C24 charges the second input capacitor C22 so as to transfer the part of charges in the first input capacitor C21, which are in excess of the charges in the second input capacitor C22, into the second input capacitor C22. As such, after several times of charging and discharging process, the voltages across the first input capacitor C21 and the second capacitor C22 tend to be equal.

If the voltages across the first input capacitor C21 and the second input capacitor C22 differ from one another, for example, if VC21<VC22, then when the first switching element Q21 and the fourth switching element Q24 are turned on, the first input capacitor C21 charges the second auxiliary capacitor C24 and the second input capacitor C22 charges the first auxiliary capacitor C23, and the charges QC24 that are charged from the first input capacitor C21 to the second auxiliary capacitor C24 differ from the charges QC23 that are charged from the second input capacitor C22 to the first auxiliary input capacitor C23, i.e., QC23>QC24. When the second switching element Q22 and the third switching element Q23 are turned on, only the first auxiliary capacitor C23 charges the first input capacitor C21 so as to transfer the part of charges in the second input capacitor C22, which are in excess of the charges in the first input capacitor C21, into the first input capacitor C21. As such, after several times of charging and discharging process, the voltages across the first input capacitor C21 and the second capacitor C22 tend to be equal.

In the structure as exemplified in FIG. 2, by controlling resistance values of the first resistor R1 and the second resistor R2 and capacitance values of the first auxiliary capacitor C23 and the second auxiliary capacitor, the speed of charging or discharging can be controlled.

It is assumed that the switching frequency of the LLC series resonant circuit is 65 kHz, the bus voltage is 800V, the capacitors C21 to C24 have capacitance values (c1 to c4) of 100 nF and withstanding voltages of 450V, and the switching cycle T is 15.4 µs, i.e., the time period from t0 to t1 is 7.7 µs, and the time period from t2 to t3 is 7.7 µs.

At a certain time, if the voltages across the first input capacitor C21 and the second input capacitor C22 differ from one another, for example, it is assumed that VC21>VC22, VC21=420V, and VC22=380V, when the resistance value r1 of the first auxiliary resistor R1 and the resistance value r2 of the second auxiliary resistor R2 are 10 ohm (r1=r2=10 ohm), a time constant $\pi$ equals to a product of a capacitance value of a charging capacitor and a resistance value of a charging resistor. Taking the first auxiliary capacitor and the first auxiliary resistor as an example, $\tau$=r1*c1=1 µs. After elapse of 3$\tau$ (3 µs), the first input capacitor C21 may fully charge the second auxiliary capacitor C24, and in the same way, the second input capacitor C22 may fully charge the first auxiliary capacitor C23, VC24=420V, VC23=380V.

If the resistance values of the first auxiliary resistor R1 and the second auxiliary resistor R2 are chosen as 15 ohm (r1=r2=15Ω), then the time constant $\pi$ is 1.5 µs. After elapse of 4.5 µs, the first input capacitor C21 fully charges the second auxiliary capacitor C24, and the second input capacitor C22 fully charges the first auxiliary capacitor C23. Thus, by choosing different resistance values for the first auxiliary resistor R1 and the second auxiliary resistor R2, or by choosing different values for the capacitance values c3, c4 of the first auxiliary capacitor C23 and the second auxiliary capacitor C24, the speed of charging can be controlled.

During discharging, the second auxiliary capacitor C24 will transfer the part of the charges in the second auxiliary capacitor C24, which are in excess of the charges in the first auxiliary capacitor C23, into the second input capacitor C22. After several such cycles of charging or discharging process, the voltages across the first input capacitor C21 and the second input capacitor C22 will keep a balance.

Thus, in the case that the capacitance values of the first auxiliary capacitor C23 and the second auxiliary capacitor C24 are equal to one another, the larger the resistance values of the first auxiliary resistor R1 and the second auxiliary resistor R2 are, the longer the charging time and the slower the charging speed will be. Preferably, the resistance value r1 of the first auxiliary resistor R1 and the capacitance value c3 of the first auxiliary capacitor c23 may satisfy the following relation: 3*(r1)*(c3)<(T/2), and the resistance value r2 of the second auxiliary resistor R2 and the capacitance value c4 of the second auxiliary capacitor C24 may satisfy the following relation: 3*(r2)*(c4)<(T/2). As such, the charging and discharging process can be completed within one switching cycle.

When the switching frequency of the LLC series resonant circuit is changed, the time required for charging or discharging may be adjusted by changing the resistance values of the first auxiliary resistor R1 and the second auxiliary resistor R2.

For example, if the switching frequency is higher than 65 kHz, the resistance values of the first auxiliary resistor R1 and the second auxiliary resistor R2 can be adjusted to be smaller so as to make the charging process be completed before the turning off of corresponding switching elements. If the switching frequency is lower than 65 kHZ, the resistance values of the first auxiliary resistor R1 and the second auxiliary resistor R2 may be adjusted to be larger so as to make the charging process be completed before the turning off of corresponding switching elements.

In the voltage balancing unit as exemplified in FIG. 2, each voltage balancing unit includes a resistor, a capacitor and a bridge arm, which resolves the problem of imbalance in the voltages across two input capacitors. In the voltage balancing units as exemplified in FIG. 2, the elements included therein have small size, and no controller is needed, and thus the voltage balancing units have good reliability and low losses.

Figure 15:
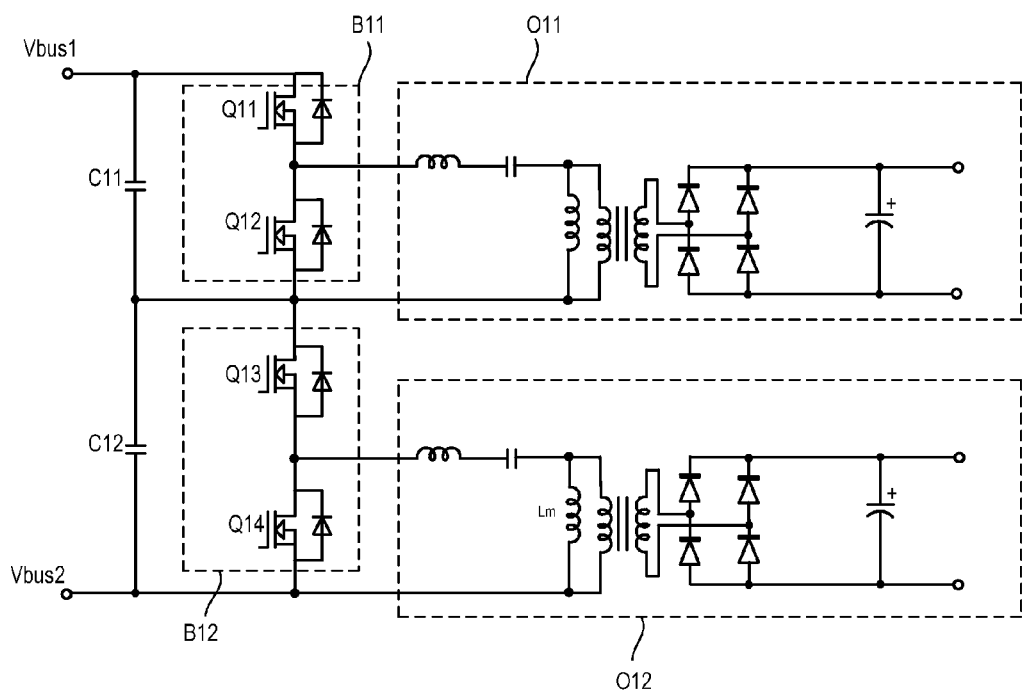
FIG. 15 illustratively shows a schematic structure diagram of a LLC series resonant converter in the prior art.

In addition, the power converter as shown in FIG. 2 further has the following advantages as compared with the power converter in conventional technologies which has two input capacitors. In the power converter of prior art as shown in FIG. 15, each of the first bridge arm B11 and the second bridge arm B12 has a LLC series resonant circuit (each of the switching element Q12 and the switching element Q14 is connected in parallel with one LLC series resonant circuit). Each of the LLC series resonant circuit needs a transformer. However, in the structure as shown in FIG. 2, only one LLC series resonant circuit is used and the LLC series resonant circuit only uses one transformer, so the circuit has a simple structure, the power converter has a small size and the control to all switching elements becomes easier.

Figure 8:
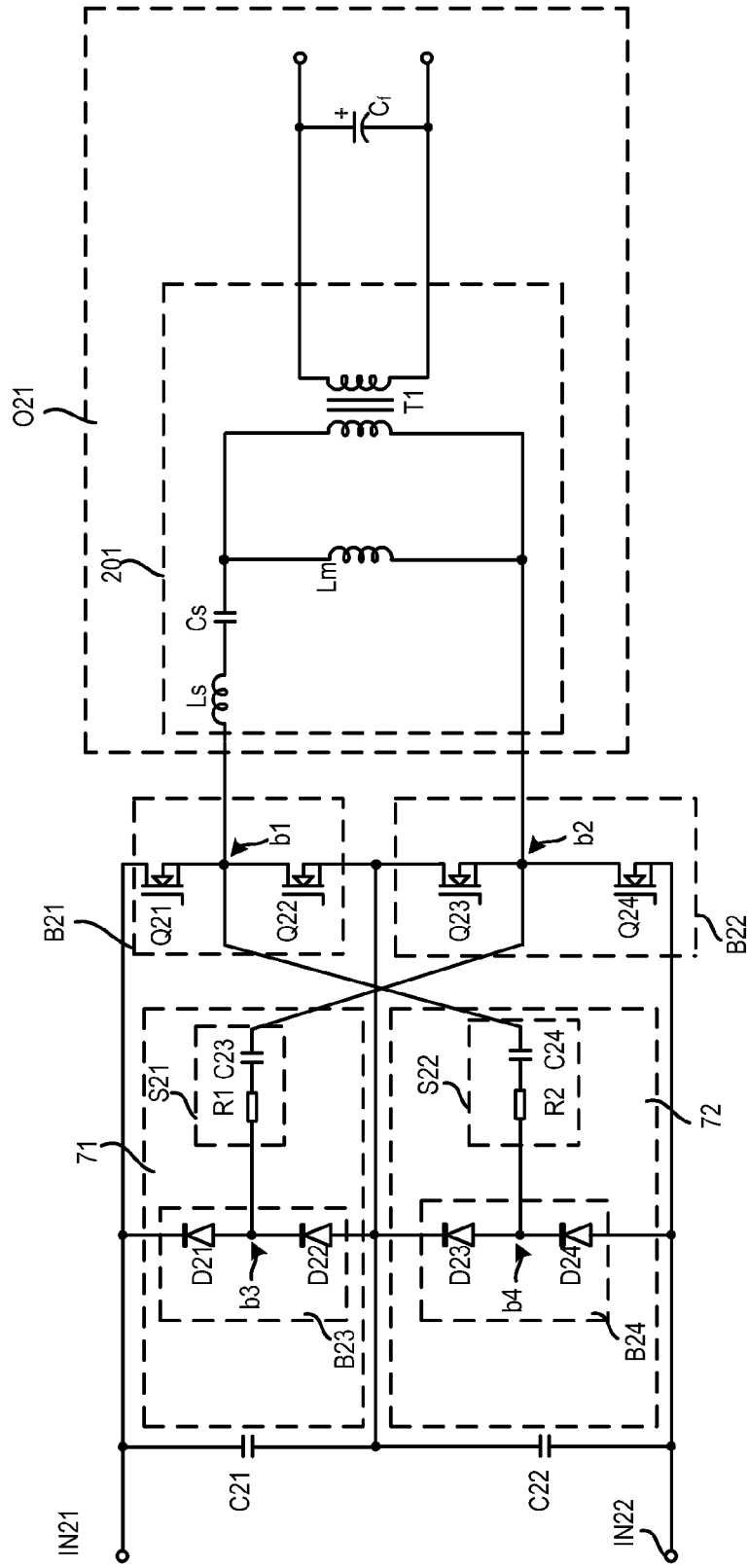
FIG. 8 illustratively shows a schematic structure diagram of a power converter according to another embodiment of the present application.

FIG. 8 illustratively shows a schematic structure diagram of a power converter according to another embodiment of the present application. The difference between this embodiment and the embodiment as shown in FIG. 2 resides in that the embodiment as shown in FIG. 8 does not include a rectifier circuit.

Since the rectifier circuit is omitted from the embodiment in FIG. 8, a DC/AC power converter may be realized.

In the foregoing embodiments, the output circuit employs a LLC series resonant circuit. Of course, other resonant structures may be employed. For example, the output circuit may employ a usual LC resonant circuit.

Figure 9:
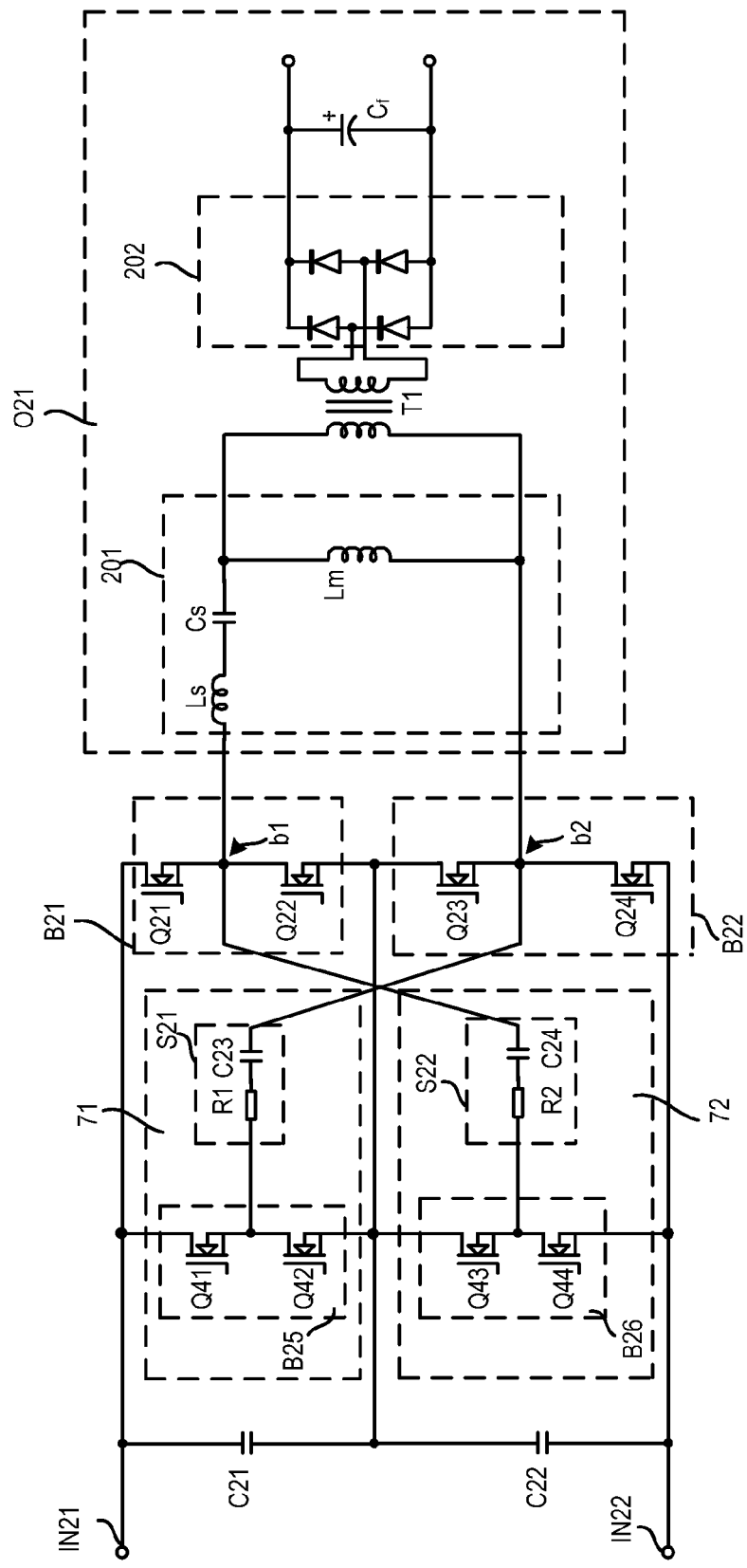
FIG. 9 illustratively shows a schematic structure diagram of a power converter according to another embodiment of the present application.

FIG. 9 illustratively shows a schematic structure diagram of a power converter according to another embodiment of the present application. The difference between this embodiment and the embodiment as shown in FIG. 2 resides in that a bridge arm B25 and a bridge arm B26 are used to replace the first unidirectional bridge arm B23 and the second unidirectional bridge arm B24. Specifically, the bridge arm B25 includes a first additional MOSFET Q41 and a second additional MOSFET Q42, and the bridge arm B26 includes a third additional MOSFET Q43 and a fourth additional MOSFET Q44. By controlling the turning on and turning off sequence of respective additional MOSFETs in FIG. 9, the bridge arm B25 and the bridge arm B26 may realize the same function as that of the diodes D21 to D24 in the unidirectional bridge arm B23 and the bridge arm B24 in FIG. 2.

In the foregoing embodiments, two input capacitors are used to share the bus voltage. When the bus voltage is relatively high, more input capacitors may be used to share the bus voltage. For example, three or more input capacitors may be used to share the bus voltage.

The operating principles of the power converter will be described below with reference to specific examples, when three or more power modules are used.

Figure 10:
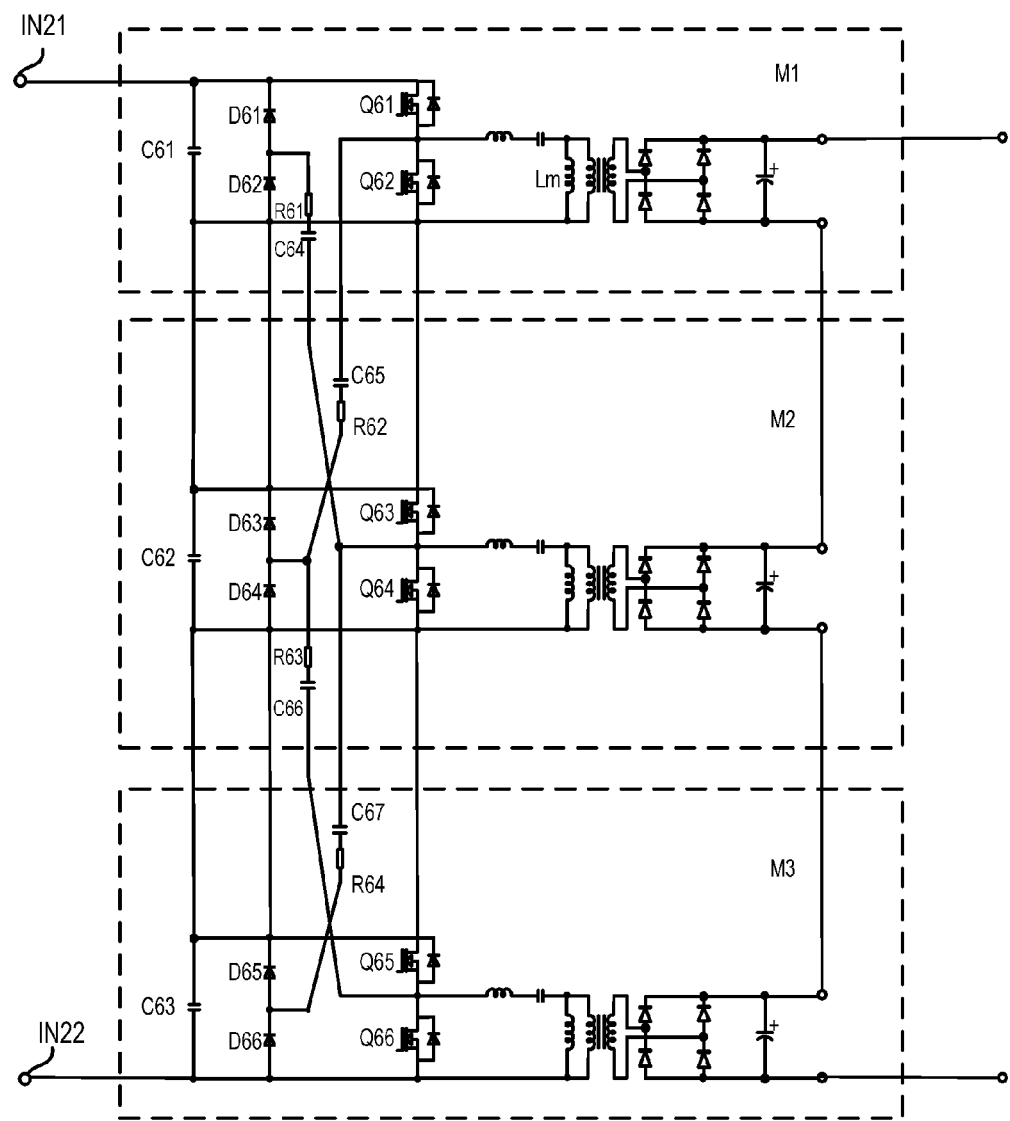
FIG. 10 illustratively shows a schematic structure diagram of a power converter according to another embodiment of the present application.

FIG. 10 illustratively shows a schematic structure diagram of a power converter according to another embodiment of the present application, in which it is shown a case of N=3, i.e., a case that the power converter includes three power modules M1 to M3, and the rectifier circuits of the three power modules are connected in series.

The operating principles of the power converter shown in FIG. 10 will be described below.

Two switching elements in the first bridge arms of the three power modules M1 to M3 turn on alternately at a phase difference of 180 degree for example. For example, when switching elements Q61, Q63 and Q65 are turned on, switching elements Q62, Q64 and Q66 are turned off, and when the switching elements Q61, Q63 and Q65 are turned off, the switching elements Q62, Q64 and Q66 are turned on. Of course, the control sequence of respective switching elements may be determined according to actual output requirements of the power converter but not limited to the above-mentioned control manner.

For example, when the switching elements Q61, Q63 and Q65 are turned on and the switching elements Q62, Q64 and Q66 are turned off, the first input capacitor C61 charges the capacitor C65, the second input capacitor C62 charges the capacitor C67, and the capacitor C64 charges the first input capacitor C61 (corresponding to that the capacitor C64 is discharged). Specific charging and discharging process depends on the voltage conditions on respective capacitors. The capacitor C66 charges the second input capacitor C62 (corresponding to that the capacitor C66 is discharged), the second input capacitor C62 charges the capacitor C67, and specific charging and discharging process depends on the voltage conditions on respective capacitors. When the switching elements Q61, Q63 and Q65 are turned off and the switching elements Q62, Q64 and Q66 are turned on, the capacitor C65 charges the second input capacitor C62 (corresponding to that the capacitor C65 is discharged), the second input capacitor C62 charges the capacitor C64; the capacitor C67 charges the third input capacitor C63 (corresponding to that the capacitor C67 is discharged), the third input capacitor C63 charges the capacitor C66, and similarly, specific charging and discharging process depends on the voltage conditions on respective capacitors.

In summary, specific charging and discharging process may vary based on the control of the on and off of specific switching elements in the three bridge arms and respective specific voltage conditions of the three input capacitors. However, it can be concluded from the above embodiments that the input capacitors having relatively high voltages will charge the voltage balancing units in the power module corresponding to the adjacent input capacitors having relatively low voltages, the voltage balancing units corresponding to the adjacent input capacitors having relatively low voltages will only charge the corresponding input capacitors, and thus the voltage balancing units are capable of playing a role of balancing the voltages across the input capacitors. However, during initial several times of on and off of the switching elements, the input capacitors having relatively low voltages may charge the voltage balancing units in the power modules corresponding to the adjacent input capacitors having relatively high voltages.

Figure 11:
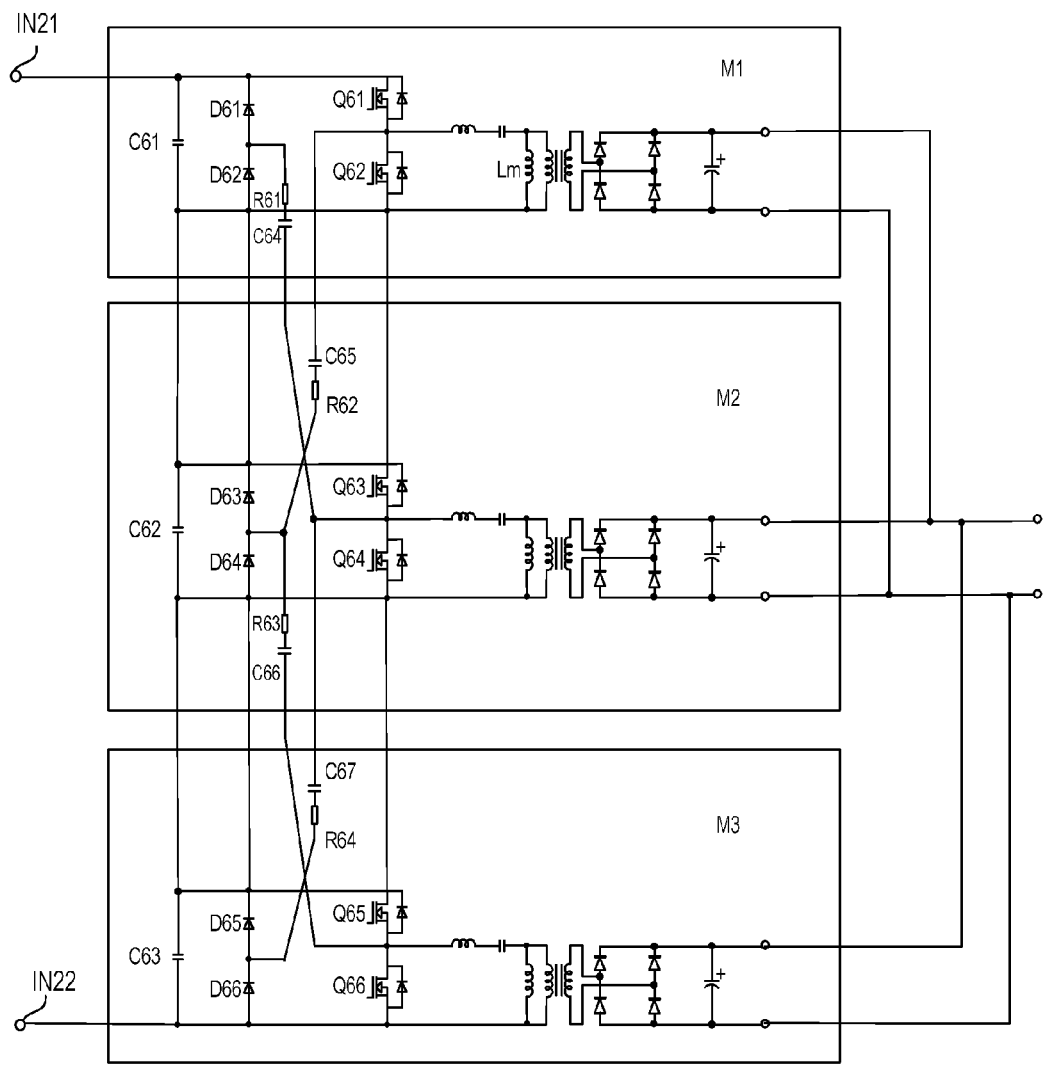
FIG. 11 illustratively shows a schematic structure diagram of a power converter according to another embodiment of the present application.

FIG. 11 illustratively shows a schematic structure diagram of a power converter according to another embodiment of the present application, in which a case of N=3 is also shown. The difference between this embodiment and the embodiment in FIG. 10 resides in that the output terminals of the rectifier circuits in the three power modules M1 to M3 are connected in parallel. The power converter in FIG. 11 has the similar operating principles as that in FIG. 10 and detailed descriptions are omitted.

Figure 12:
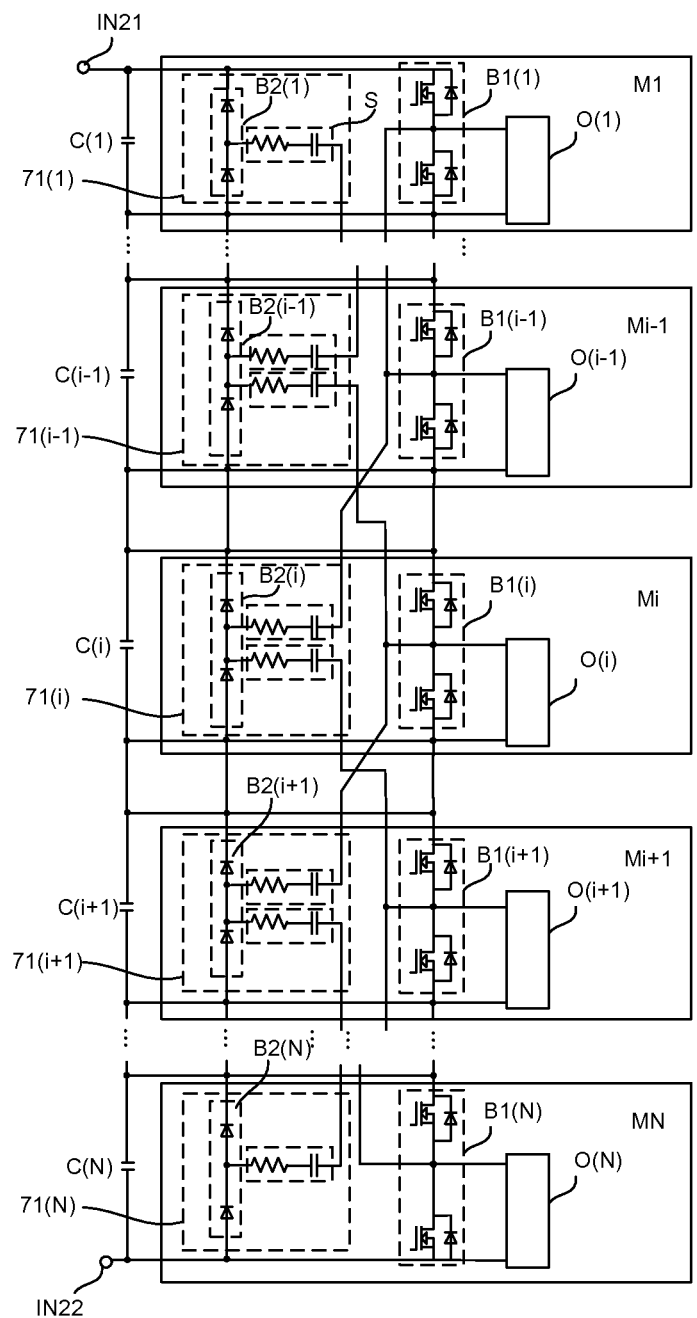
FIG. 12 illustratively shows a schematic structure diagram of a power converter according to another embodiment of the present application.

FIG. 12 illustratively shows a schematic structure diagram of a power converter according to another embodiment of the present application. In this embodiment, the power converter includes a first DC input terminal IN21, a second DC input terminal IN22, N input capacitors C(1), C(2), . . . , C(N) and N power modules M1, M2, . . . , MN. N is a natural number equal to or larger than 3. The N input capacitors are connected in series between the two DC input terminals IN21 and IN22.

The i-th power module Mi includes a first bridge arm B1(i) and an output circuit O(i), and i is any nature number from 1 to N. The first bridge arm B1(i) is connected in parallel with the input capacitor C(i), has a bridge arm midpoint and is connected in series with a first bridge arm B1(i+1) in an adjacent power module.

An output circuit O(i) has a terminal connected with the midpoint of the first bridge arm B1(i) and the other terminal connected with a terminal of the input capacitor C(i) which is connected in parallel with the first bridge arm B1(i). The output circuit receives a square-wave signal outputted from the bridge arm. The output circuit O(i) generates an output signal required by the power converter based on the signals at the midpoint of the first bridge arm B1(i) and a terminal of the first bridge arm B1(i).

The i-th power module Mi further includes a voltage balancing unit 71(i), which includes a unidirectional bridge arm B2(i). The unidirectional bridge arm B2(i) is correspondingly connected in parallel with the input capacitor C(i), and is connected in series with a unidirectional bridge arm B2(i+1) in an adjacent power module.

For a power module in which a voltage balancing unit resides having only one adjacent power module, such as an outmost power module among the N power modules, the voltage balancing unit therein further includes a capacitive branch S which has a terminal connected with the midpoint of the unidirectional bridge arm and the other terminal connected with a midpoint of a bridge arm in the adjacent power module.

For a power module in which a voltage balancing unit resides having two adjacent power modules, such as a power module other than the outmost ones among the N power modules, the voltage balancing unit therein further includes two capacitive branches each of which has one terminal connected with the midpoint of the unidirectional bridge arm, and the other terminal connected with a bridge arm midpoint in either one of the two adjacent power modules.

In the power converter shown in FIG. 12, each of the unidirectional bridge arms includes two diodes, an anode of one diode is connected with a cathode of the other diode to form the midpoint of the unidirectional bridge arm, and a remaining anode and a remaining cathode of the two diodes are connected with two terminals of corresponding input capacitors, respectively.

The capacitive branch S includes an auxiliary capacitor and an auxiliary resistor which are connected in series. The parameters of the auxiliary capacitors and the auxiliary resistors may satisfy the following relation: 3RC<T/2, where C represents the capacitance value of the auxiliary capacitor, R represents the resistance value of the auxiliary resistor, and T represents a switching cycle of the respective first bridge arm.

The first bridge arm in each power module may include a plurality of switching elements which are connected in series, for example, it may include two switching elements which are connected in series and have complementary on and off. A junction where the two switching element are connected in series serves as the midpoint of the first bridge arm.

In the structure shown in FIG. 12, by adding voltage balancing units into each power module, the problem of imbalance in the voltages across a plurality of input capacitors is resolved.

Figure 13:
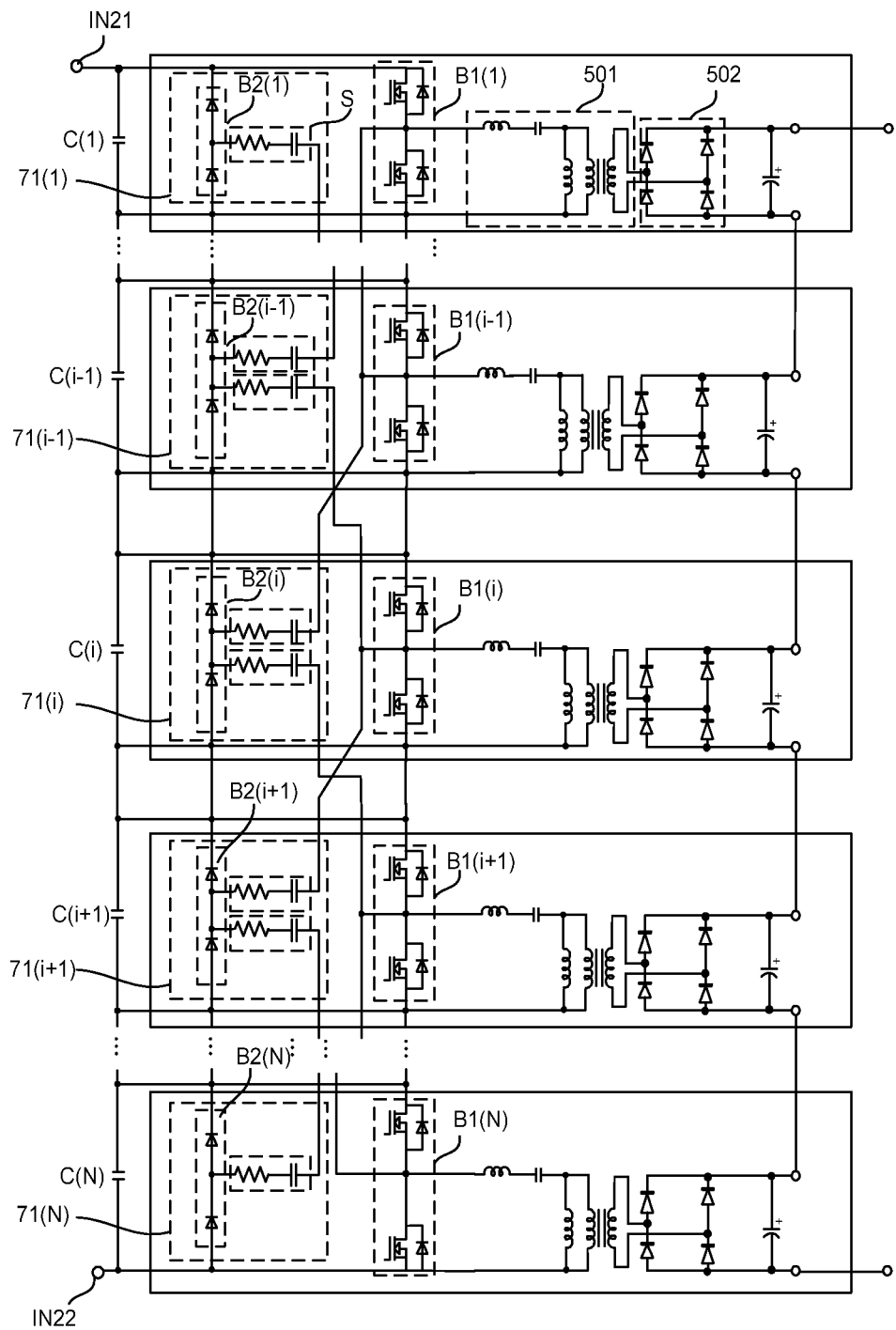
FIG. 13 illustratively shows a schematic structure diagram of a power converter according to another embodiment of the present application.

FIG. 13 illustratively shows a schematic structure diagram of a power converter according to an embodiment of the present application, in which a DC/DC converter structure is shown. The output circuit in each power module includes a resonant circuit 501, a rectifier circuit 502 and an output capacitor $C_f$.

The resonant circuit 501 is a LLC series resonant circuit including a resonant inductor Ls, a resonant capacitor Cs and a transformer T1. A primary side of the transformer T1 further equivalently includes a magnetizing inductor Lm. The resonant inductor Ls and the resonant capacitor Cs are connected in series with the primary side of the transformer T1, and the magnetizing inductor Lm is connected in parallel with the primary side of the transformer T1.

The transformer T1 and the rectifier circuit 502 are similar to that in FIG. 2 and detailed descriptions are omitted.

In the power converter shown in FIG. 13, the output terminals of respective rectifier circuits are connected in series. Such structure is preferably suitable for a case of high voltage output. The structure of the capacitive branch in the voltage balancing unit as exemplified in FIG. 13 is the same as that of the capacitive branch in FIG. 2 and detailed descriptions are omitted. The voltage balancing unit employing such structure has many advantages such as a small size, no need of a controller, good reliability or low losses. Of course, other equivalent structures of the voltage balancing units which are modified but have the same functions are not excluded and more examples are omitted.

Figure 14:
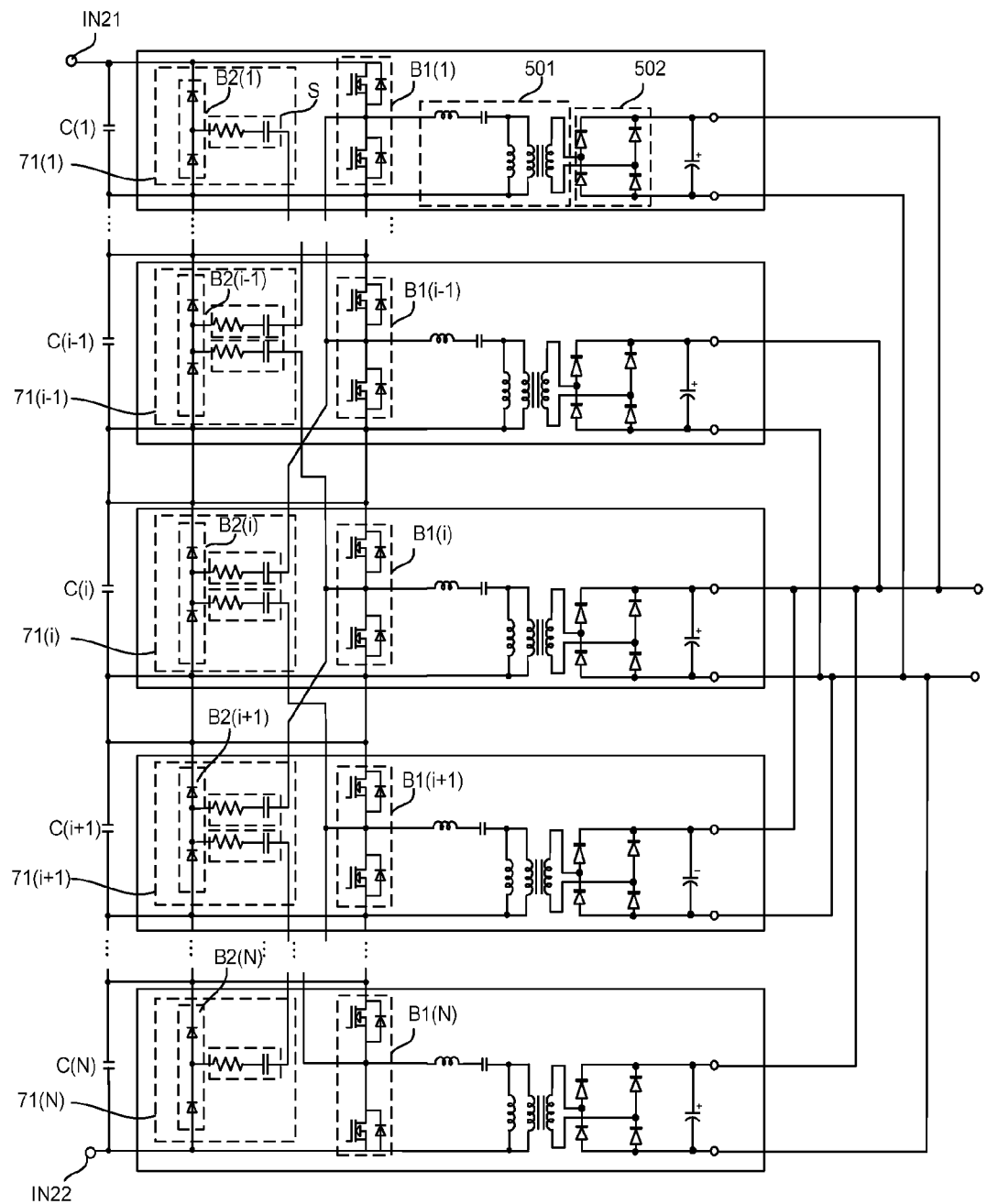
FIG. 14 illustratively shows a schematic structure diagram of a power converter according to another embodiment of the present application.

FIG. 14 illustratively shows a schematic structure diagram of a power converter according to another embodiment of the present application. In this embodiment, the output terminals of respective rectifier circuits are connected in parallel, and such structure is suitable for a case of large current output.

For the power converters shown in FIGS. 13 and 14, the control sequence of the switching elements in respective bridge arms B(1)-B(N) may be determined according to actual requirements. What are exemplified herein are half-bridge structures in which each bridge arm includes two switching elements. The two switching elements in each bridge arm may alternately be turned on, for example, at a phase difference of 180 degree.

In addition, in respective embodiments in FIGS. 10-14, the switching elements included in the auxiliary bridge arms may be configured by diodes or by field effect transistors such as MOSFET.

The resistance values of the resistors and the capacitance values of the capacitors in respective charging or discharging units may satisfy a condition that a tripled product of a resistance value of a resistor and a capacitance value of a capacitor is less than a half of a switching cycle of a bridge arm in the power converter, so as to make complete charging or discharging operation be completed before turning off these switching elements and thereby to improve the reliability of the power converter.

The present application further provides a voltage balancing method of the power converter as shown in FIGS. 1 and 2, and the method includes the following steps:

providing a power converter as shown in FIG. 1 or 2;

when voltages across the first input capacitor and the second input capacitor differ from one another, adding voltage balancing units, the number of which is equal to the number of the input capacitors, comprising: a first voltage balancing unit and a second voltage balancing unit;

during a half operating cycle of the power converter, controlling the first input capacitor to charge the second voltage balancing unit, and controlling the second input capacitor to charge the first voltage balancing unit;

during the other half operating cycle of the power converter, controlling the first voltage balancing unit to charge the first input capacitor or controlling the second voltage balancing unit to charge the second input capacitor; and after several operating cycles of the power converter, a voltage difference between the first input capacitor and the second input capacitor being reduced.

The half cycle of the power converter may refer to a period when the first switching element Q21 of the first bridge arm and the fourth switching element Q24 of the second bridge in FIGS. 1 and 2 are turned on and the second switching element Q22 and the third switching element Q23 are turned off. The other half cycle of the power converter may refer to a period when the first switching element Q21 and the fourth switching element Q24 are turned off and the second switching element Q22 and the third switching element Q23 are turned on.

By such voltage balancing method, the voltages across the input capacitors C21 and C22 can be maintained to be equal.

The present application further provides a voltage balancing method of the power converter as shown in FIGS. 10-14, and the method includes the following steps:

providing any one of power converters as shown in FIGS. 10-14;

when voltages across the N input capacitors differ from one another, adding into each power module a voltage balancing unit including an unidirectional bridge arm which has a unidirectional bridge arm midpoint, is correspondingly connected in parallel with one of the input capacitors, and is connected in series with an unidirectional bridge arm in an adjacent power module;

wherein for a power module in which a voltage balancing unit resides having only one adjacent power module, such as an outmost power module among the N power modules, the voltage balancing unit therein further includes a capacitive branch having a terminal connected with the unidirectional bridge arm midpoint and the other terminal connected with a bridge arm midpoint in the adjacent power module;

for a power module in which a voltage balancing unit resides having two adjacent power modules, such as a power module other than the outmost ones among the N power modules, the voltage balancing unit therein further includes two capacitive branches each of which has a terminal connected with the unidirectional bridge arm midpoint and the other terminal connected with bridge arm midpoint in either one of the two adjacent power modules;

wherein the method further includes:

controlling input capacitors having relatively higher voltages as compared with adjacent input capacitors to charge voltage balancing units in power modules corresponding to the adjacent input capacitors having relatively lower voltages; and controlling the voltage balancing units in the power modules corresponding to the adjacent input capacitors having relatively lower voltages to charge the adjacent input capacitors having relatively lower voltages.

For the voltage balancing method of the power converters having three or more power modules may refer to the operating principles described above in detail with reference to FIG. 10.

By such voltage balancing method, the voltages of respective input capacitors in a power converter having three or more power modules may be balanced.

Although the present invention has been described with reference to typical embodiments, it should be understood that the terminologies herein are for illustration purposes rather than to limit the present invention. The present invention can be implemented in many specific embodiments without departing from the spirit and scope of the present invention, and thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A power converter comprising:
two Direct Current (DC) input terminals;
a first input capacitor and a second input capacitor connected in series between the two DC input terminals;
a first bridge arm and a second bridge arm connected in series between the two DC input terminals, the first bridge arm being connected in parallel with the first input capacitor and having a first bridge arm midpoint, and the second bridge arm being connected in parallel with the second input capacitor and having a second bridge arm midpoint;
a first voltage balancing unit and a second voltage balancing unit, each of which has three terminals; the first voltage balancing unit having two terminals connected in parallel with the first input capacitor and a remaining terminal connected with the second bridge arm midpoint, the second voltage balancing unit having two terminals connected in parallel with the second input capacitor and a remaining terminal connected with the first bridge arm midpoint, and the first voltage balancing unit and the second voltage balancing unit being configured to reduce a voltage difference between the first input capacitor and the second input capacitor; and
an output circuit electrically coupled with the first bridge arm midpoint and the second bridge arm midpoint.

2. The power converter according to claim 1, wherein each of the first and second voltage balancing units comprises an unidirectional bridge arm and a capacitive branch; the unidirectional bridge arm has two terminals connected in parallel with corresponding one of the first and second input capacitors and is provided with an unidirectional bridge arm midpoint; and the capacitive branch has a terminal connected with the unidirectional bridge arm midpoint and the other terminal connected with corresponding one of the first and second bridge arm midpoints.

3. The power converter according to claim 2, wherein the unidirectional bridge arm comprises two diodes, an anode of one of the diodes is connected with a cathode of the other one of the diodes to form the unidirectional bridge arm midpoint, and a remaining anode and a remaining cathode of the two diodes are connected with two terminals of corresponding one of the first and second input capacitors, respectively.

4. The power converter according to claim 2, wherein the capacitive branch comprises an auxiliary capacitor and an auxiliary resistor which are connected in series with one another.

5. The power converter according to claim 4, wherein parameters of the auxiliary capacitor and the auxiliary resistor satisfy the following relation:

$$3RC<T/2,$$

where C represents a capacitance value of the auxiliary capacitor, R represents a resistance value of the auxiliary resistor, and T represents a switching cycle of the first bridge arm and the second bridge arm.

6. The power converter according to claim 1, wherein each of the first and second bridge arms comprises two switching elements being connected in series with one another and having complementary on and off; a junction where the two switching elements are connected in series with one another serves as the bridge arm midpoint.

7. The power converter according to claim 6, wherein two adjacent switching elements, which are included respectively in the first and second bridge arms, are turned on and off synchronously, and the remaining two switching elements in the first and second bridge arms are turned on and off synchronously.

8. The power converter according to claim 1, wherein the output circuit comprises a resonant circuit having two terminals coupled respectively with the first bridge arm midpoint and the second bridge arm midpoint.

9. The power converter according to claim 8, wherein the resonant circuit comprises a resonant inductor, a resonant capacitor, and a transformer, and the resonant inductor, the resonant capacitor and a primary side of the transformer are connected in series with one another.

10. The power converter according to claim 9, wherein the output circuit further comprises a rectifier circuit and an output capacitor, in which the output capacitor is bridged across output terminals of the rectifier circuit and input terminals of the rectifier circuit are connected with a secondary side of the transformer.

11. A power converter comprising:
two Direct Current (DC) input terminals;
N input capacitors connected in series between the two DC input terminals; and
N power modules;
wherein each of the N power modules comprises:
a bridge arm being connected in parallel with corresponding one of the N input capacitors, having a bridge arm midpoint, and being connected in series with a bridge arm in an adjacent power module;
a voltage balancing unit comprising an unidirectional bridge arm which has a unidirectional bridge arm midpoint, is connected in parallel with the corresponding one of the N input capacitors and is connected in series with an unidirectional bridge arm in the adjacent power module;
for a first power module in which a voltage balancing unit resides having only one adjacent power module, the voltage balancing unit in the first power module further comprises a capacitive branch having a terminal connected with the unidirectional bridge arm midpoint and the other terminal connected with a bridge arm midpoint in the adjacent power module;
for a second power module in which a voltage balancing unit resides having two adjacent power modules, the voltage balancing unit in the second power module further comprises two capacitive branches each of which has a terminal connected with the unidirectional bridge arm midpoint and the other terminal connected with a bridge arm midpoint in corresponding one of the two adjacent power modules; and
an output circuit having a terminal connected with the bridge arm midpoint and the other terminal connected with a terminal of the input capacitor being in parallel with the bridge arm;

wherein N is a natural number being equal to or greater than 3.

12. The power converter according to claim 11, wherein the output circuit comprises a resonant circuit having two terminals connected respectively with the bridge arm midpoint and the terminal of the input capacitor being in parallel with the bridge arm.

13. The power converter according to claim 12, wherein the resonant circuit comprises a resonant inductor, a resonant capacitor and a transformer, and the resonant inductor, the resonant capacitor and a primary side of the transformer are connected in series with one another.

14. The power converter according to claim 13, wherein the output circuit further comprises a rectifier circuit and an output capacitor, in which the output capacitor is bridged across output terminals of the rectifier circuits, input terminals of the rectifier circuit are connected with a secondary side of the transformer, and the output terminals of the rectifier circuit are connected in parallel or in series with output terminals of a rectifier circuit in adjacent power modules.

15. The power converter according to claim 11, wherein the unidirectional bridge arm comprises two diodes, an anode of one of the diodes is connected with a cathode of the other one of the diodes to form the unidirectional bridge arm midpoint, and a remaining anode and a remaining cathode of the two diodes are connected respectively with two terminals of the corresponding one of N input capacitors.

16. The power converter according to claim 11, wherein the capacitive branch comprises an auxiliary capacitor and an auxiliary resistor which are connected in series with one another.

17. The power converter according to claim 11, wherein parameters of the auxiliary capacitor and the auxiliary resistor satisfy the following relation:

$$3RC<T/2,$$

where C represents a capacitance value of the auxiliary capacitor, R represents a resistance value of the auxiliary resistor, and T represents a switching cycle of the bridge arm.

18. The power converter according to claim 11, wherein the bridge arm comprises two switching elements being connected in series with one another and having complementary on and off; and a junction where the two switching elements are connected in series with one another serves as the bridge arm midpoint.

19. A method for balancing voltages across input capacitors in a power converter comprising:
providing a power converter which comprises: two Direct Current (DC) input terminals; a first input capacitor and a second input capacitor connected in series between the two DC input terminals; a first bridge arm and a second bridge arm connected in series between the two DC input terminals, the first bridge arm being connected in parallel with the first input capacitor and having a first bridge arm midpoint, the second bridge arm being connected in parallel with the second input capacitor and having a second bridge arm midpoint; and an output circuit electrically coupled with the first bridge arm midpoint and the second bridge arm midpoint;
when voltages across the first input capacitor and the second input capacitor differ from one another, adding voltage balancing units the number of which is equal to the number of the input capacitors, comprising: a first voltage balancing unit and a second voltage balancing unit;
during a half operating cycle of the power converter, controlling the first input capacitor to charge the second voltage balancing unit, and controlling the second input capacitor to charge the first voltage balancing unit;

during the other half operating cycle of the power converter, controlling the first voltage balancing unit to charge the first input capacitor or controlling the second voltage balancing unit to charge the second input capacitor; and after several operating cycles of the power converter, a voltage difference between the first input capacitor and the second input capacitor being reduced.

20. The method according to claim 19, wherein each of the first and second voltage balancing units comprises an unidirectional bridge arm and a capacitive branch, the unidirectional bridge arm is connected in parallel with one of the first and second bridge arms and provided with an unidirectional bridge arm midpoint; and the capacitive branch has a terminal connected with the unidirectional bridge arm midpoint and the other terminal connected with a bridge arm midpoint of the other one of the first and second bridge arms.

21. The method according to claim 20, wherein the unidirectional bridge arm comprises two diodes, an anode of one of the diodes is connected with a cathode of the other one of the diodes to form the unidirectional bridge arm midpoint, and a remaining anode and a remaining cathode of the two diodes are connected respectively with two terminals of corresponding one of the first and second input capacitors.

22. The method according to claim 19, wherein the output circuit comprises a resonant circuit having two terminals coupled respectively with the first bridge arm midpoint and the second bridge arm midpoint.

23. The method according to claim 19, wherein the first bridge arm comprises a first switching element and a second switching element which are connected in series with one another and have complementary on and off;

the second bridge arm comprises a third switching element and a fourth switching element which are connected in series with one another and have complementary on and off;

wherein during the half operating cycle of the power converter, the first switching element and the fourth switching element are controlled to be turned on and the second switching element and the third switching element are controlled to be turned off so as to control the first input capacitor to charge the second voltage balancing unit and to control the second input capacitor to charge the first voltage balancing unit;

during the other operating cycle of the power converter, the first switching element and the fourth switching element are controlled to be turned off and the second switching element and the third switching element are controlled to be turned on so as to control the first voltage balancing unit to charge the first input capacitor or to control the second voltage balancing unit to charge the second input capacitor.

24. A method for balancing voltages across input capacitors in a power converter comprising:

providing a power converter which comprises:

two Direct Current (DC) input terminals;

N input capacitors connected in series between the two DC input terminals; and

N power modules connected in parallel with the N input capacitors one to one;

wherein each of the N power modules comprises: a bridge arm being connected in parallel with corresponding one of the N input capacitors, having a bridge arm midpoint and being connected in series with a bridge arm in an adjacent power module; and an output circuit having a terminal connected with the bridge arm midpoint and the other terminal connected with a terminal of the corresponding one of the N input capacitors which is in parallel with the bridge arm; and wherein N is a natural number being equal to or greater than 3;

when voltages across the N input capacitors differ from one another, adding into each power module a voltage balancing unit comprising an unidirectional bridge arm which has a unidirectional bridge arm midpoint, is connected in parallel with the corresponding one of the N input capacitors and is connected in series with an unidirectional bridge arm in the adjacent power module;

for a first power module in which a voltage balancing unit resides having only one adjacent power module, the voltage balancing unit in the first power module further comprises a capacitive branch having a terminal connected with the unidirectional bridge arm midpoint and the other terminal connected with a bridge arm midpoint in the adjacent power module;

for a second power module in which a voltage balancing unit resides having two adjacent power modules, the voltage balancing unit in the second power module further comprises two capacitive branches each of which has a terminal connected with the unidirectional bridge arm midpoint and the other terminal connected with a bridge arm midpoint in corresponding one of the two adjacent power modules;

wherein the method further comprises:

controlling input capacitors having relatively higher voltages as compared with adjacent input capacitors to charge voltage balancing units in power modules corresponding to the adjacent input capacitors having relatively lower voltages; and controlling the voltage balancing units in the power modules corresponding to the adjacent input capacitors having relatively lower voltages to charge the adjacent input capacitors having relatively lower voltages.

25. The method according to claim 24, wherein the output circuit comprises a resonant circuit having two terminals connected respectively with the bridge arm midpoint and a terminal of the corresponding one of the N input capacitor being in parallel with the bridge arm.

26. The method according to claim 25, wherein the resonant circuit comprises a resonant inductor, a resonant capacitor and a transformer, and the resonant inductor, the resonant capacitor and a primary side of the transformer are connected in series with one another.

* * * * *